United States Patent
Zahora et al.

(10) Patent No.: US 10,903,717 B2
(45) Date of Patent: Jan. 26, 2021

(54) REPAIRED ROTOR OF A MULTI-PHASE ELECTRIC MOTOR AND METHOD OF REPAIR

(71) Applicants: Joseph A. Zahora, Kettering, OH (US); William R. Compton, Fairborn, OH (US)

(72) Inventors: Joseph A. Zahora, Kettering, OH (US); William R. Compton, Fairborn, OH (US)

(73) Assignee: DAYTON-PHOENIX GROUP, INC., Dayton, OH (US)

( * ) Notice: Subject to any disclaimer, the term of this patent is extended or adjusted under 35 U.S.C. 154(b) by 260 days.

(21) Appl. No.: 16/112,135

(22) Filed: Aug. 24, 2018

(65) Prior Publication Data
US 2020/0067387 A1 Feb. 27, 2020

(51) Int. Cl.
| H02K 17/16 | (2006.01) |
| H02K 15/02 | (2006.01) |
| H02K 7/14 | (2006.01) |
| H02K 15/00 | (2006.01) |
| H02K 1/26 | (2006.01) |

(Continued)

(52) U.S. Cl.
CPC ............ *H02K 7/14* (2013.01); *H02K 15/0006* (2013.01); *H02K 15/0062* (2013.01); *H02K 17/165* (2013.01); *H02K 1/26* (2013.01); *H02K 1/30* (2013.01); *H02K 3/12* (2013.01);
(Continued)

(58) Field of Classification Search
CPC .. H02K 1/26; H02K 1/30; H02K 3/51; H02K 15/0006; H02K 15/0012; H02K 15/0062; H02K 15/024; H02K 17/12; H02K 17/16; H02K 17/165; H02K 17/18; H02K 17/185;
(Continued)

(56) References Cited

U.S. PATENT DOCUMENTS 2,499,390 A * 3/1950 Joy ...................... H02K 17/165
310/211
8,575,796 B1 11/2013 Zahora et al.
(Continued)

FOREIGN PATENT DOCUMENTS

CN 206283388 U * 6/2017

OTHER PUBLICATIONS

Machine Translation of CN206283388U, Jun. 2017 (Year: 2017).*
Stone et al., Squirrel Cage Induction Rotor Winding Failure Mechanisms and Repair, 2014 (Year: 2014).*

*Primary Examiner* — Quyen P Leung
*Assistant Examiner* — Eric Johnson
(74) *Attorney, Agent, or Firm* — Thompson Hine LLP

(57) ABSTRACT

A repaired rotor of a multi-phase electric motor includes a plurality of annular laminations stacked to form a cylindrical core about a central axis, each of the laminations having notches aligned to form axially extending slots about a periphery of the core; a plurality of electrical conductors extending through the slots; a pair of conductive end rings, each attached to a different end of the cylindrical core and electrically connected to the plurality of electrical conductors; and an outer end ring abutting and electrically connected to one of the pair of conductive end rings and electrically connected to adjacent ends of the plurality of electrical conductors, the outer end ring providing an uninterrupted electrically conductive path connecting the plurality of electrical conductors.

20 Claims, 4 Drawing Sheets

(51) Int. Cl.
 *H02K 1/30* (2006.01)
 *H02K 3/12* (2006.01)
 *H02K 17/12* (2006.01)
 *H02K 3/51* (2006.01)

(52) U.S. Cl.
 CPC ........... *H02K 3/51* (2013.01); *H02K 15/0012* (2013.01); *H02K 15/024* (2013.01); *H02K 17/12* (2013.01)

(58) Field of Classification Search
 CPC ... H02K 17/20; H02K 17/205; B22D 19/0054
 USPC ....... 310/71; 29/402.09, 402.13, 402.16, 598
 See application file for complete search history.

(56) References Cited

U.S. PATENT DOCUMENTS

| | | | |
|---|---|---|---|
| 9,570,968 B1* | 2/2017 | Chen | B23K 26/21 |
| 2012/0019091 A1* | 1/2012 | Hong | H02K 15/0012 |
| | | | 310/211 |
| 2012/0217839 A1* | 8/2012 | Kajiya | H02K 17/16 |
| | | | 310/211 |
| 2012/0248908 A1* | 10/2012 | Zahora | F04D 25/082 |
| | | | 310/62 |
| 2012/0293036 A1* | 11/2012 | Kleber | H02K 17/165 |
| | | | 310/211 |
| 2015/0102697 A1* | 4/2015 | Jung | H02K 17/165 |
| | | | 310/211 |
| 2016/0248288 A1* | 8/2016 | Bastien | F04D 25/0606 |
| 2018/0205297 A1* | 7/2018 | Toledo | H02K 7/1838 |
| 2018/0323690 A1* | 11/2018 | Weber | H02K 17/165 |

* cited by examiner

REPAIRED ROTOR OF A MULTI-PHASE ELECTRIC MOTOR AND METHOD OF REPAIR

TECHNICAL FIELD

The disclosure relates to repair of electric motors, and more particularly, to repaired rotors of multi-phase electric motors and methods of repair of rotors of multi-phase electric motors.

BACKGROUND

A stator and a rotor are essential components of an electric motor, including an alternating current (AC) induction motor. The stator typically comprises a stack of laminations formed and arranged in a substantially cylindrical shape having a plurality of longitudinally extending slots spaced evenly about a periphery of the lamination stack. Coils of wire, typically made of copper, are placed within the slots and connected to a source of alternating current. Magnetic fields created by the flow of alternating current through the coils induce magnetic fields in the adjacent rotor, causing the rotor to rotate about the center of the stator.

Similarly, the rotor comprises a stack of laminations, typically made of steel, formed and arranged in a substantially cylindrical shape having a plurality of longitudinal wedge-shaped slots spaced evenly about a periphery of the lamination stack. In large, heavy-duty motors, conductors in the form of wedge-shaped bars are inserted into and extend along the slots of the rotor. This arrangement of laminations and conductors are held in place by conductive end rings on opposing ends of the lamination stack. The conductive end rings are made of a conductive metal, such as aluminum, the electrically connect the conductor bars to each other. The conductive end rings are welded to the end laminations of the stack and to the adjacent ends of the conductor bars.

In one embodiment of such a heavy-duty AC induction motor, the stator is in the form of a cylinder positioned within and surrounded by a rotor in the form of a hollow cylinder. Such a design is useful in machines such as cooling fans, in which fan blades may be attached to and driven by the rotor. Large AC induction motors often are utilized in harsh environments, such as in diesel-electric locomotives. Repeated cycles of heating and cooling, starting and stopping of rotor rotation, vibration, as well as extended periods of use, break down the motor components, including the stator. In one type of failure, one or both of the conductive end rings and/or weld metal attaching the conductive end rings to the laminations and conductor bars cracks or splits. Such cracks, shown in FIG. 1, may extend through the weld metal and the conductive end rings. The cracks not only adversely affect the overall structural integrity of the rotor, but they can adversely affect the electric fields induced in the rotor from the stator windings, and may cause excess heat, reduced motor performance, and eventually motor failure.

Repair of cracked conductive end rings and conductive end ring welds typically requires a labor-intensive and costly grinding and cutting away of the conductive end rings and weld metal, and replacement with new conductive end rings that are welded to the end laminations and conductor bars of the rotor. Accordingly, there is a need for rotor repair process that provides a robust rotor, but requires minimal time and materials.

SUMMARY

The present disclosure describes a method of repairing a damaged rotor and a rotor repaired by the described method. The advantage of the disclosed method is that it eliminates the need for grinding and cutting away the damaged conductive end rings and weld metal, which significantly reduces the labor cost of repair, and significantly reduces the amount of time the rotor is out of service.

In one embodiment, a repaired rotor of a multi-phase electric motor includes a cylindrical core having axially extending slots about a periphery thereof; a plurality of electrical conductors extending through the slots; a pair of conductive end rings, each attached to a different end of the cylindrical core and electrically connected to the plurality of electrical conductors; and an outer end ring abutting and electrically connected to one of the pair of conductive end rings and electrically connected to adjacent ends of the plurality of electrical conductors, the outer end ring providing an uninterrupted electrically conductive path connecting the plurality of electrical conductors and bridges cracks or splits in the one of the pair of conductive end rings.

In another embodiment, a repaired rotor of a multi-phase electric motor includes a plurality of annular laminations stacked to form a cylindrical core about a central axis, each of the laminations having notches aligned to form axially extending slots about a periphery of the core; a plurality of electrical conductors extending through the slots; a pair of conductive end rings, attached to opposite ends of the cylindrical core and electrically connected to opposite ends of the plurality of electrical conductors; a pair of outer end rings abutting and electrically connected to the pair of conductive end rings and electrically connected to the ends of the plurality of electrical conductors, the outer end rings providing an uninterrupted electrically conductive path connecting the plurality of electrical conductors and bridges cracks or splits in the conductive end rings; and inner peripheral weld beads attaching each of the pair of outer end rings to an adjacent one of the pair of conductive end rings and to adjacent ones of the ends of the electrical conductors.

In yet another embodiment, a method of repairing a rotor of a multi-phase electric motor is applied to a rotor having a plurality of annular laminations stacked to form a cylindrical core about a central axis, each of the laminations having notches aligned to form axially extending slots about a periphery of the core, a plurality of electrical conductors extending through the slots, and a pair of conductive end rings attached to opposing ends of the cylindrical core and electrically connected to the plurality of electrical conductors. The method includes attaching an outer end ring in abutting and electrically connected relation to the cracked conductive end ring such that the outer end ring provides an uninterrupted electrically conductive path connecting the plurality of electrical conductors.

Other aspects of the disclosed repaired rotor of a multi-phase electric motor and method of repair will be apparent from the following description, the accompanying drawings and the appended claims.

DETAILED DESCRIPTION

Figure 1:
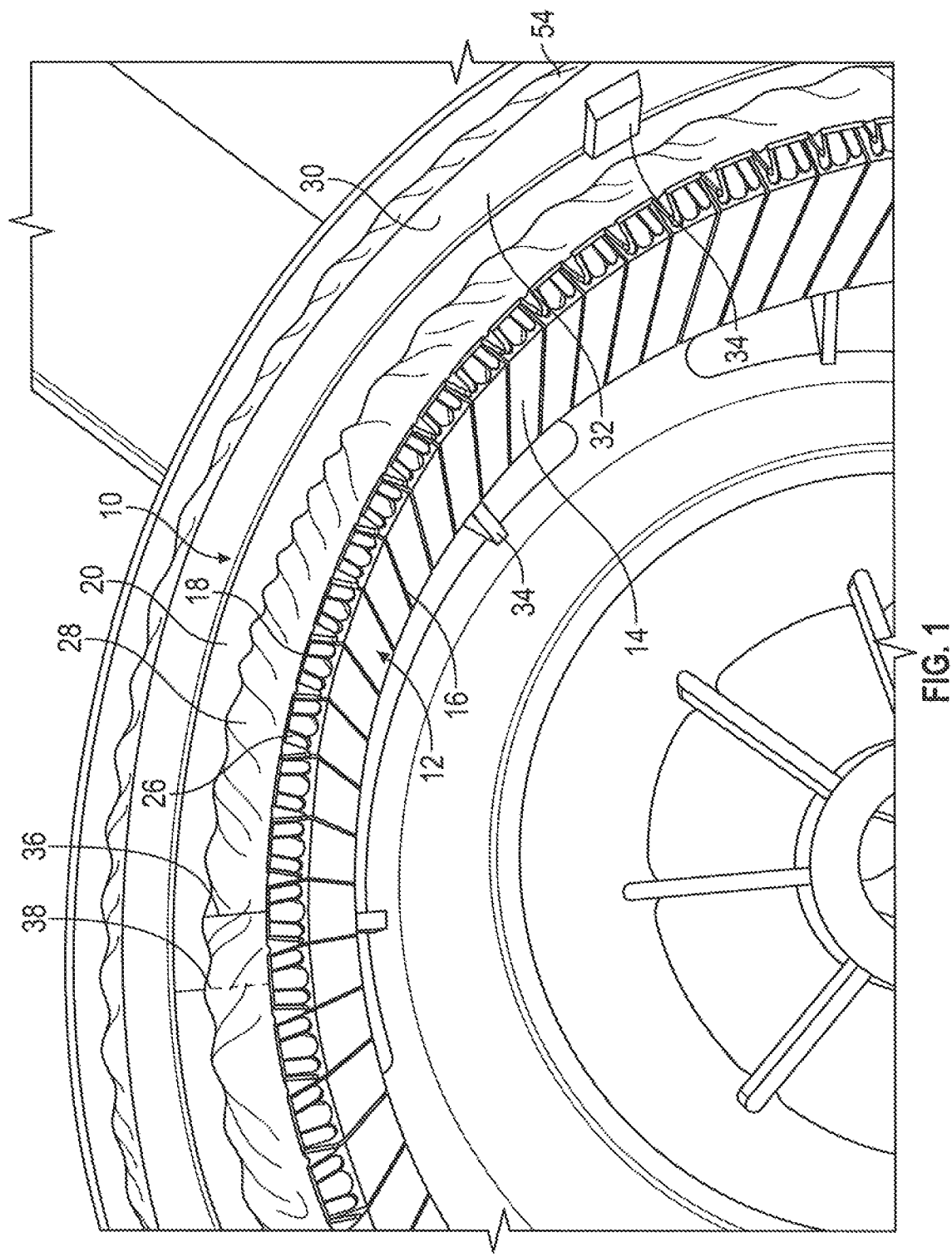
FIG. 1 is a partial end view of a rotor in need of repair having cracks in the conductive end ring and in the weld metal.
Figure 4:
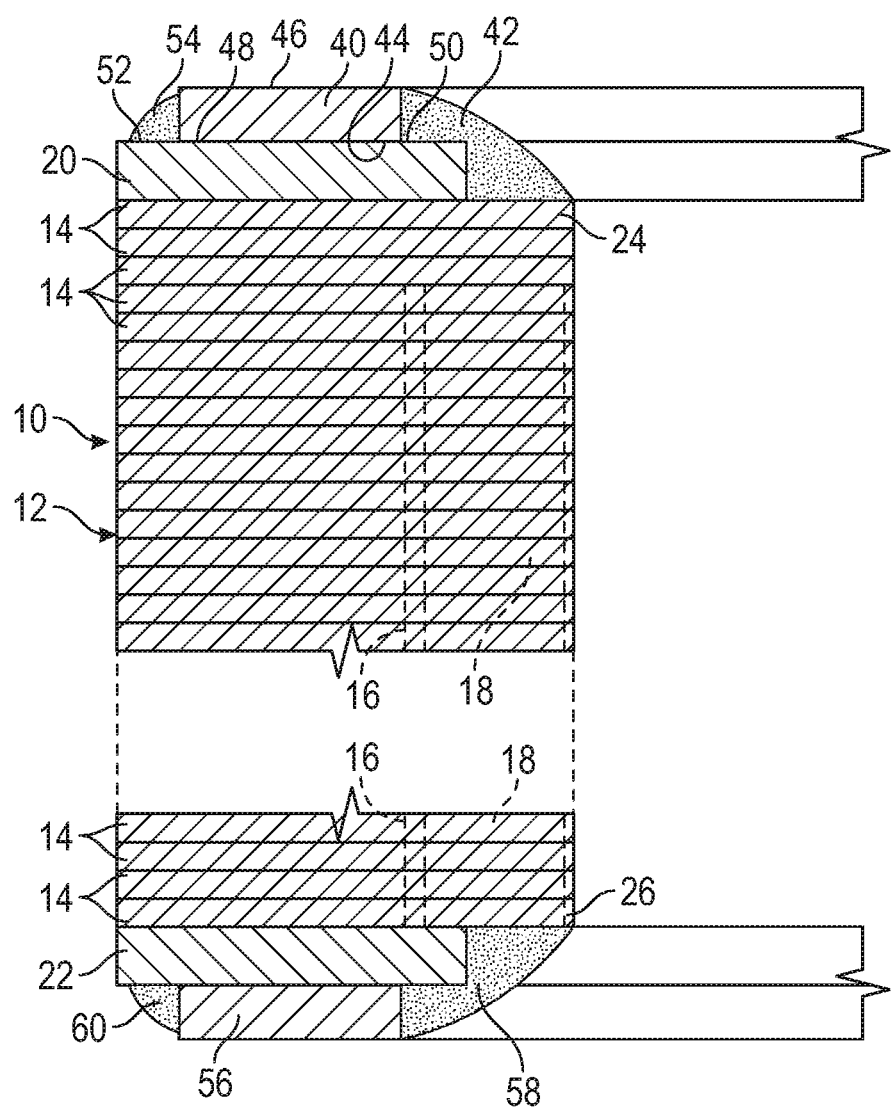
FIG. 4 is a schematic detail in partial section taken at line 4-4 of FIG. 2.

As shown in FIGS. 1 and 4, a rotor, generally designated 10, in embodiments is a rotor of a multi-phase electric motor, such as a three-phase induction motor. The rotor 10 includes a generally cylindrical core 12 with a central axis A (see FIG. 2). The core 12 is made up of a stack of a plurality of flat, annular, notched rotor laminations 14. The cylindrical core 12 includes a cylindrical inner surface defining a cylindrical passageway that receives a complementary cylindrical stator (not shown). The notches of the laminations 14 are aligned to form plurality of axially extending, wedge-shaped slots 16 about a periphery, and in embodiments, the radially inner periphery, of the core 12. The wedge-shaped slots 16 receive elongate, correspondingly wedge-shaped conductors 18 that extend the entire length of the slots. The laminations 14 typically are stamped from a sheet of steel, and the conductors 18 are bars or rods of copper.

The stack of laminations 14 and conductors 18 are secured by conductive end rings 20, 22 that are attached to the end laminations 24, 26 and the ends of the conductors by a continuous, annular bead of weld metal 28 (shown only for conductive end ring 20 in FIG. 1, it being understood that conductive end ring 22 is similarly attached by a continuous, annular bead of weld metal). In an embodiment, the conductive end rings 20, 22 are made of aluminum, as are the beads of weld metal 28. The beads of weld metal 28 attach the conductive end rings 20, 22 to the end laminations 24, 26 and to the adjacent ends of the conductors 18, so that the conductors are electrically connected to each other at each end by the conductive end rings 20, 22 and associated beads of weld metal 28. In an embodiment, the rotor 10 is retained within a fan hub 30 having a plurality of radially extending fan blades, and is secured to the interior wall 32 of the hub housing by a press fit and/or lugs 34.

The rotor 10 of FIG. 1 is in need of repair. Over time and as a result of extensive use and operation in harsh environments, and prolonged exposure to vibration, the weld metal 28 at either or both ends of the rotor 10, and/or one or both of the conductive end rings 20, 22, may develop one or more cracks 36, 38, respectively, and must be repaired or replaced. The cracks 36, 38 may extend partially or completely through the weld metal 28 at either or both ends of the rotor 10, and/or one or both of the conductive end rings 20, 22. Such cracks 36, 38 reduce or break entirely the electrical connectivity between the conductors 18 and reduce the output of, or render inoperable, the electric motor of which the rotor 10 is a component.

Figure 2:
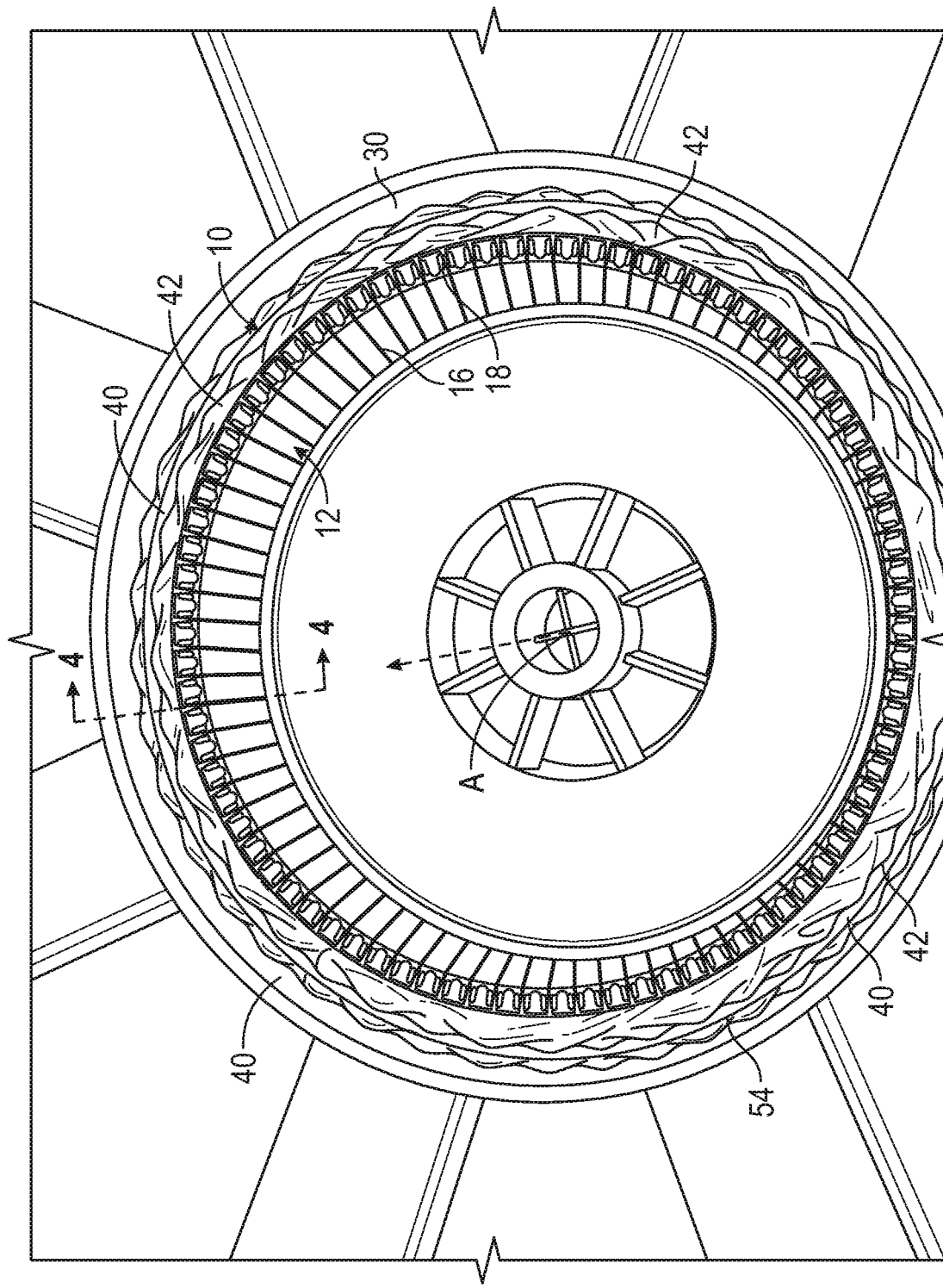
FIG. 2 is an end view of the rotor of FIG. 1 repaired by the disclosed process.
Figure 3:
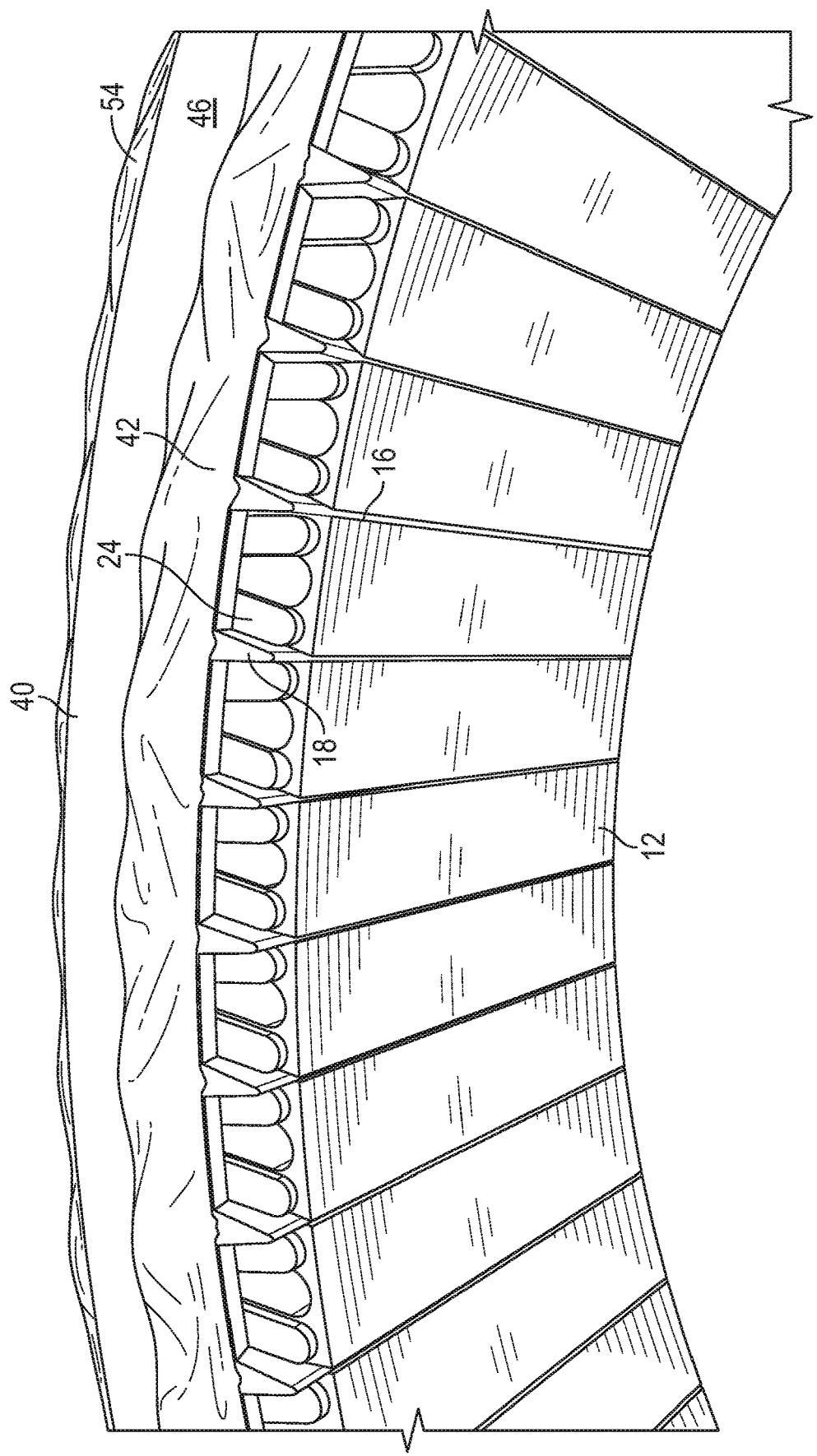
FIG. 3 is a detail of the repaired rotor of FIG. 2.

In an exemplary embodiment shown in FIGS. 2, 3, and 4, such a damaged rotor 10 is repaired by attaching an outer end ring 40 such that it abuts and is electrically connected to a damaged one, or in embodiments to both, of the pair of conductive end rings 20, 22 and is electrically connected to adjacent ends of the plurality of electrical conductors 18. By way of example, as shown in FIG. 4, outer end ring 40 is attached to conductive end ring 20. Thus, the outer end ring 40 provides an uninterrupted electrically conductive path or bridge over the cracks 36, 38 connecting the plurality of electrical conductors 18 of the rotor 10.

In an embodiment, the outer end ring 40 is welded to the conductive end ring 20 by an annular bead of weld metal 42. In embodiments, the outer end ring 40 is also welded to the adjacent ends of the electrical conductors 18 by the annular bead of weld metal 42. In an embodiment, the outer end ring 40 includes an inner radially flat face 44 and an outer radially flat face 46. In an embodiment, the conductive end ring 20 is machined to provide a flat, annular outer surface 48 extending radially from the central axis to receive the inner radially flat face 44 of the outer end ring 40 in abutting relation about the circumference of the inner radially flat face. Also in the embodiment, the original annular bead of weld metal 28 is partially ground away before the outer end ring 40 is welded to the core 12 by weld metal 42, so that the weld metal 42 used to attach the outer end ring 40 makes a secure mechanical and electrical connection with both the conductive end ring 20, the conductors 18, and the adjacent end lamination 24.

In an embodiment, the inner diameter of the outer end ring 40 is greater than the inner diameter of the conductive end ring 20, and the outer diameter of the outer end ring 40 is less than the outer diameter of the conductive end ring 20. These differences in diameters create an exposed inner weld surface 50 on the upper surface 48 that allows the annular bead of weld metal 42 to attach the outer end ring 40 to the conductive end ring 20. Similarly, the difference in diameters (i.e., radial thickness) of the outer end ring 40 and conductive end ring 20 creates an exposed outer weld surface 52 that in embodiments receives a second, outer annular bead of weld metal 54 that secures the outer end ring to the conductive end ring. Thus, in the embodiment shown in FIG. 4, the inner annular bead of weld metal 42 and the outer annular bead of weld metal 54 extend continuously about the inner diameter and the outer diameter, respectively, of the outer end ring 40.

In an exemplary embodiment, a method of repairing the rotor 10 of the multi-phase electric motor includes attaching the outer end ring 40 in abutting and electrically connected relation to the conductive end ring 20 such that the outer end ring provides an uninterrupted electrically conductive path connecting the plurality of electrical conductors. The outer end ring 40 is welded to the conductive end ring 20, and to the adjacent ends of the electrical conductors 18.

In an embodiment, the conductive end ring 20, which may be cracked, split, spalled and/or otherwise damaged and in need of repair or replacement, is first prepared to accept the outer end ring 40 by forming the flat annular axially outer surface 48 on the conductive end ring extending radially from the central axis A to receive the inner radially flat face 44 of the outer end ring 40 in abutting relation about a circumference of the inner radially flat face. In embodiments, the preparation includes grinding a flat, or substantially flat, outer surface 48 on the conductive end ring 20 so that the mating faces of the outer surface 48 of the conductive end ring 20 and the inner surface of the outer end ring 40 make physical and electrical contact with each other about, or substantially about, the entire circumferences of the outer end ring and conductive end ring.

Also in embodiments, the original weld metal 28, which itself may be cracked, split, spalled, and/or otherwise in need of repair, either together with the conductive end ring 20 or by itself if the associated conductive ring is intact, is ground or cut away from the electrical conductors 18, end lamination 24, and/or from the conductive end ring 20. However, it is not necessary to completely remove the bead of the original weld metal 28 from the electrical conductors 18, conductive end ring 20, and/or end lamination 24, although in other embodiments, the original weld metal 28 is entirely, or substantially entirely, removed by grinding and/or cutting from the ends of the electrical conductors, conductive end ring, and/or laminations. At this time the core 12 itself may be cleaned of contaminants and corrosion by dipping and/or sandblasting. In embodiments, the core 12 is first removed from the hub 30 before initiating the process.

The annular bead of weld metal 42, and optionally outer bead of weld metal 54, are applied to join the outer end ring 40 to the conductive end ring 20, and to adjacent ends of the electrical conductors 18. In embodiments, the beads of weld metal 42, 54 join the outer end ring 40 to the conductive end ring 20 at an inner diameter and at an outer diameter of the outer end ring. It is to be understood that in most applications, the process of repairing the rotor 12 by preparing the conductive end ring 20 and original weld bead 28, and attaching the new outer end ring 40 and new annular weld bead 42, also will be performed in similar fashion on conductive end ring 22 and its associated original annular weld bead and end lamination 26, by attaching outer end ring 56 and securing it to conductive end ring 22 and end lamination 26 by weld beads 58, 60, as shown in FIG. 4.

The described process to repair a rotor 10 with a cracked, split, spalled, or otherwise damaged conductive end ring 20 and/or original weld bead 28 can be effected relatively quickly and inexpensively, without removal of the conductive end ring 20. The resultant repaired rotor is as robust as the original rotor, if not more so. While the forms of apparatus and methods described herein may constitute preferred embodiments of the disclosed repaired rotor of a multi-phase electric motor and method of repair, it is to be understood that the invention is not limited to these precise embodiments, and changes may be made therein without departing from the scope of the invention.

What is claimed is:

1. A repaired rotor of a multi-phase electric motor, the rotor comprising:
    a cylindrical core having a central axis, a stack of a plurality of rotor laminations, including a pair of end laminations, and axially extending slots about a periphery thereof;
    a plurality of electrical conductors extending through the slots;
    a pair of conductive end rings, each attached to a different end of the cylindrical core and electrically connected to the plurality of electrical conductors;
    an outer end ring abutting and electrically connected to one of the pair of conductive end rings and electrically connected to adjacent ends of the plurality of electrical conductors, the outer end ring providing an uninterrupted electrically conductive path connecting the plurality of electrical conductors and bridges cracks or splits in the one of the pair of conductive end rings; and
    the outer end ring being attached by a bead of weld metal to the one of the pair of conductive end rings and to the one of the pair of end laminations.

2. The rotor of claim 1, wherein the bead of weld metal attaches the one of the pair of conductive end rings to the adjacent ends of the plurality of electrical conductors.

3. The rotor of claim 1, wherein the outer end ring is welded to the adjacent ends of the electrical conductors by the bead of weld metal.

4. The rotor of claim 1, wherein the outer end ring includes an inner radially flat face and an outer radially flat face.

5. The rotor of claim 4, wherein the one of the pair of conductive end rings is machined to provide a flat, annular outer surface extending radially from the central axis to receive the inner radially flat face of the outer end ring in abutting relation about an entire circumference of the inner radially flat face.

6. The rotor of claim 5, wherein the one of the pair of conductive end rings is welded to adjacent ends of the electrical conductors by the bead of weld metal.

7. The rotor of claim 5, wherein an inner diameter of the outer end ring is greater than an inner diameter of the one of the pair of conductive end rings.

8. The rotor of claim 1, wherein the cylindrical core includes a cylindrical inner surface defining a cylindrical passageway that receives a complementary stator.

9. The rotor of claim 1, wherein the cylindrical core is received within a cylindrical fan hub having a plurality of radially extending fan blades.

10. A repaired rotor of a multi-phase electric motor, the repaired rotor comprising:
    a plurality of annular laminations stacked to form a cylindrical core about a central axis and including a pair of end laminations, each of the laminations having notches aligned to form axially extending slots about a periphery of the core;
    a plurality of electrical conductors extending through the slots;
    a pair of conductive end rings, attached to opposite ends of the cylindrical core and electrically connected to opposite ends of the plurality of electrical conductors;
    a pair of outer end rings abutting and electrically connected to the pair of conductive end rings and electrically connected to the ends of the plurality of electrical conductors, the outer end rings providing an uninterrupted electrically conductive path connecting the plurality of electrical conductors and bridges cracks or splits in the conductive end rings; and
    inner peripheral weld beads attaching each of the pair of outer end rings to an adjacent one of the pair of conductive end rings, to an adjacent one of the pair of end laminations, and to adjacent ones of the ends of the electrical conductors.

11. A method of repairing a rotor of a multi-phase electric motor, the rotor having a central axis, a stack of a plurality of rotor laminations including a pair of end laminations with axially extending slots about a periphery thereof, a plurality of electrical conductors extending through the slots, and a pair of conductive end rings attached to the end laminations and electrically connected to the plurality of electrical conductors, the method comprising:
    attaching an outer end ring in abutting and electrically connected relation to one of the pair of conductive end rings in need of repair and to an adjacent one of the pair of end laminations by a bead of weld metal such that the outer end ring provides an uninterrupted electrically conductive path connecting the plurality of electrical conductors and bridges cracks and splits in the conductive end ring.

12. The method of claim 11, further comprising welding the outer end ring to the adjacent ends of the electrical conductors by the bead of weld metal.

13. The method of claim 12, further comprising applying the bead of weld metal to an inner periphery of the outer end ring, and applying another bead of weld metal to an outer periphery of the outer end ring to attach the outer end ring to the conductive end ring.

14. The method of claim 11, further comprising the bead of weld metal is applied to adjacent ends of the electrical conductors; wherein the bead of weld metal joins the outer end ring to the conductive end ring in need of repair at an inner diameter and another bead of weld metal joins the outer end ring to the conductive end ring in need of repair at an outer diameter of the outer end ring.

15. A repaired rotor of a multi-phase electric motor, the rotor comprising:
    a cylindrical core having a central axis and axially extending slots about a periphery thereof;
    a plurality of electrical conductors extending through the slots;

a pair of conductive end rings, each attached to a different end of the cylindrical core and electrically connected to the plurality of electrical conductors, one of the pair of conductive end rings being machined to provide a flat, annular outer surface extending radially from the central axis; and an outer end ring abutting and electrically connected to the one of the pair of conductive end rings and electrically connected to adjacent ends of the plurality of electrical conductors, the outer end ring providing an uninterrupted electrically conductive path connecting the plurality of electrical conductors and bridges cracks or splits in the one of the pair of conductive end rings;

wherein the outer end ring includes an inner radially flat face and an outer radially flat face, the flat, outer annular surface receiving the inner radially flat face in abutting relation about an entire circumference of the inner radially flat face; and wherein an inner diameter of the outer end ring is greater than an inner diameter of the one of the pair of conductive end rings.

16. The rotor of claim 15, wherein an outer diameter of the outer end ring is less than an outer diameter of the one of the pair of conductive end rings.

17. The rotor of claim 16, further comprising weld metal forming a weld joining the outer end ring to the one of the pair of conductive end rings, and to the ends of the electrical conductors.

18. The rotor of claim 16, wherein the weld metal from welding joins the outer end ring to the one of the conductive end rings at the inner diameter and at the outer diameter of the outer end ring.

19. The rotor of claim 18, wherein the weld metal extends continuously about the inner diameter and the outer diameter of the outer end ring.

20. A repaired rotor of a multi-phase electric motor, the rotor comprising:

a cylindrical core having a central axis, a stack of a plurality of rotor laminations, including a pair of end laminations, and axially extending slots about a periphery thereof;

a plurality of electrical conductors extending through the slots;

a pair of conductive end rings, each attached to a different end of the cylindrical core by original weld metal and electrically connected to the plurality of electrical conductors;

an outer end ring abutting and electrically connected to one of the pair of conductive end rings and electrically connected to adjacent ends of the plurality of electrical conductors, the outer end ring providing an uninterrupted electrically conductive path connecting the plurality of electrical conductors and bridges cracks or splits in the one of the pair of conductive end rings and/or in the original weld metal; and the outer end ring being attached to the one of the pair of conductive end rings and to an adjacent one of the pair of end laminations by an annular bead of weld metal extending about an inner diameter of the outer end ring and to the one of the pair of conductive end rings by a second, outer annular bead of weld metal extending about an outer diameter of the outer end ring.

* * * * *